United States Patent
Anderson et al.

(10) Patent No.: US 10,231,184 B1
(45) Date of Patent: Mar. 12, 2019

(54) COGNITIVE ASSISTANT FOR MOBILE DEVICES IN LOW POWER MODE

(71) Applicant: International Business Machines Corporation, Armonk, NY (US)

(72) Inventors: Evelyn R. Anderson, Houston, TX (US); Natalie Brooks Powell, Bolingbrook, IL (US); Kristen Conley, Kieler, WI (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/132,699

(22) Filed: Sep. 17, 2018

Related U.S. Application Data

(63) Continuation of application No. 15/865,523, filed on Jan. 9, 2018.

(51) Int. Cl.
| | |
|---|---|
| *G06F 1/32* | (2006.01) |
| *H04M 3/436* | (2006.01) |
| *H04W 28/02* | (2009.01) |
| *H04W 52/02* | (2009.01) |
| *H04L 12/823* | (2013.01) |
| *G06F 1/3212* | (2019.01) |

(52) U.S. Cl.
CPC ...... *H04W 52/0261* (2013.01); *G06F 1/3212* (2013.01); *H04L 47/32* (2013.01); *H04W 28/0221* (2013.01); *H04W 52/0254* (2013.01); *H04M 3/4365* (2013.01)

(58) Field of Classification Search
CPC ......... H04W 52/0261; H04W 28/0221; H04W 52/0254; G06F 1/3212; H04L 47/32; H04M 3/4365
See application file for complete search history.

(56) References Cited

U.S. PATENT DOCUMENTS

| | | |
|---|---|---|
| 8,010,167 B2 | 8/2011 | Cotevino et al. |
| 8,958,854 B1 | 2/2015 | Morley et al. |
| 9,065,765 B2 | 6/2015 | Alisawi |
| 2003/0123437 A1 | 7/2003 | Nevalainen |

(Continued)

OTHER PUBLICATIONS

Disclosed Anonymously, "Adaptive Alerts for Calendar Events on Mobile Device Based on User Behavior and Battery Capacity", PCOM000227720D, IP.com , May 13, 2013, 10 pages.

(Continued)

*Primary Examiner* — Nguyen T Vo

(74) *Attorney, Agent, or Firm* — Scully, Scott, Murphy & Presser, P.C.; Robert J. Shatto

(57) ABSTRACT

A cognitive assistant for mobile devices in low power mode. A first signal may be received from a mobile device via a communication network, the first signal indicating that the mobile device entered low power mode. Responsive to receiving the first signal, communications from a plurality of servers directed to the mobile device may be rerouted to another hardware processor, wherein the hardware processor receives the communications instead of the mobile device receiving the communications. The hardware processor may analyze the communications' content and assign weights to the communications. A selected set of communications that are assigned weights exceeding a threshold value is transmitted to the mobile device in low power mode.

20 Claims, 5 Drawing Sheets

(56) References Cited

U.S. PATENT DOCUMENTS

| | | |
|---|---|---|
| 2005/0096102 A1 | 5/2005 | Mock et al. |
| 2006/0050670 A1 | 3/2006 | Hillyard et al. |
| 2007/0097933 A1 | 5/2007 | Kuc |
| 2014/0344289 A1 | 11/2014 | Berenson et al. |
| 2015/0271176 A1 | 9/2015 | Wei |
| 2016/0029316 A1 | 1/2016 | Mohan et al. |
| 2018/0196880 A1* | 7/2018 | Carter ............... G06F 17/30867 |

OTHER PUBLICATIONS

List of IBM Patents or Patent Applications Treated as Related, dated Sep. 17, 2018, 2 pages.

* cited by examiner

COGNITIVE ASSISTANT FOR MOBILE DEVICES IN LOW POWER MODE

FIELD

The present application relates generally to computers and computer applications, and more particularly to a cognitive assistant for mobile devices in low power mode.

BACKGROUND

Different operating systems running on devices offer services for preserving battery life when battery levels are low. For instance, an operating system may limit background processing including background synchronizing of electronic mail (email), messaging, and other apps. Another operating system may turn off features including, for example, background email fetch, and app updating. While these low power modes help to save battery life, they present a risk that the device does not transmit a communication that may be considered important; for instance, a user may miss an important communication. For example, the device may not provide a notification of an urgent communication such as an email message requiring the recipient's immediate attention; the device may not be able to provide a new message requesting that the recipient reply on an instant message service; the device may not be able to apply a patch to correct a flaw in an enterprise app, presenting a security risk.

BRIEF SUMMARY

A cognitive assistant method and system for mobile devices in low power mode may be provided. The method, in one aspect, may include receiving a first signal from a mobile device via a communication network by a hardware processor, the first signal indicating that the mobile device entered low power mode. The method may also include, responsive to receiving the first signal, rerouting communications from a plurality of servers directed to the mobile device, to the hardware processor, wherein the hardware processor receives the communications instead of the mobile device receiving the communications. The method may also include analyzing by the hardware processor the communications' content. The method may further include assigning weights to the communications by the hardware processor based on the analyzing. The method may also include transmitting by the hardware processor a selected set of communications assigned weights exceeding a threshold value, to the mobile device in low power mode.

A cognitive assistant system for mobile devices in low power mode, in one aspect, may include a hardware processor coupled with a communication interface and communicating with a mobile device and a plurality of servers. The hardware processor may be operable to receive a first signal from the mobile device via the communication interface, the first signal indicating that the mobile device entered low power mode. Responsive to receiving the first signal, the hardware processor may be operable to reroute communications from the plurality of servers directed to the mobile device, to the hardware processor, wherein the hardware processor receives the communications instead of the mobile device receiving the communications. The hardware processor may be operable to analyze the communications' content, assign weights to the communications based on analyzing the communications' content, and transmit a selected set of communications that are assigned weights exceeding a threshold value, to the mobile device in low power mode.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A cognitive system and method for a mobile device that enters a low power mode are provided. The cognitive system, in some embodiments, is a cloud-based system. The system in one embodiment may off-load processing capabilities from the mobile device to the cognitive system, for example, ensuring that urgent communications such as messages and emails are still sent to the mobile device automatically, ensuring urgent messages are received as high priority notifications. The system may push through updates determined to be critical (e.g., based on a threshold value) or disable the appropriate app until the update can be applied. In some embodiments, the cognitive system optimizes the communications the mobile device in low power mode receives.

In some embodiment, a cognitive assistant is enabled responsive to a mobile device entering low power mode. The cognitive assistant, in some embodiment, uses cognitive analysis to determine which communications are sufficiently urgent to be sent to the mobile device in its low power state, and which can wait until the mobile device exits low power mode. The sufficiency or urgency may be determined based on a communication meeting a threshold associated with one or more criteria. The cognitive assistant, in some embodiments, analyzes the severity of app updates and sends a message to a mobile device in low power mode to disable access to an app if the severity level presents a sufficiently high danger. The sufficiency for determining the danger may be based on one or more criteria.

Figure 1:
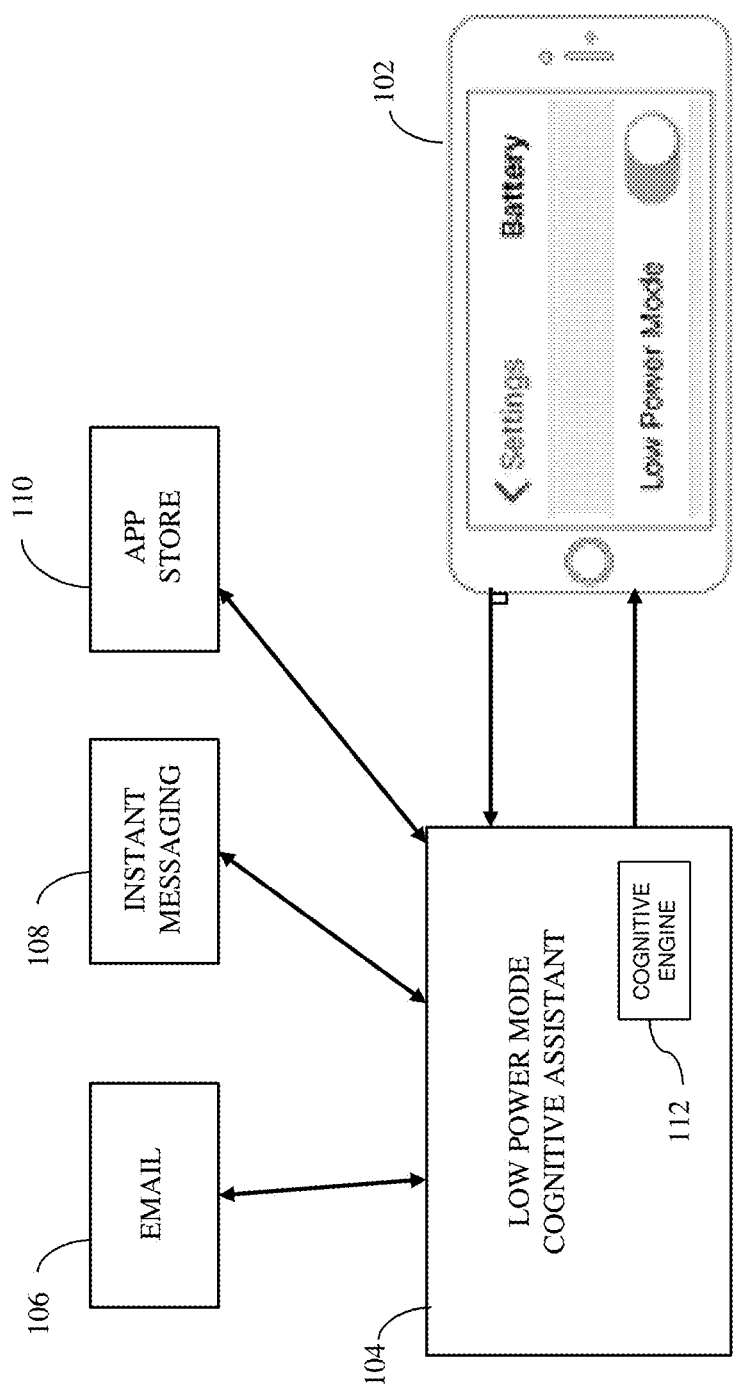
FIG. 1 is a diagram showing components of a system in one embodiment. A mobile device 102 may enter into low power mode.

FIG. 1 is a diagram showing components of a system in one embodiment. A mobile device 102 may enter into low power mode. For example, a mobile device 102 low on battery is entered in to a low power mode, either manually by the user or automatically at a predetermined battery level by the mobile device itself. The mobile device 102 sends a notification, via a communication network, to a cognitive assistant component 104, for example, running in the cloud, communicating that low power mode has been enabled for the mobile device 102. The mobile device 102 may then enable low power mode, including turning off automatic fetching of emails, messages, and app updates.

Responsive to the mobile device 102 switching to low power mode, incoming communications are rerouted to the cognitive assistant component 104. One or more hardware processors run the cognitive assistant component 104, for example, in cloud-based computing environment. For instance, responsive to receiving a notification that the mobile device 102 is switching to low power mode, the cognitive assistant 104 redirects notifications that are directed to the mobile device 102 toward the cognitive assistant instead. For example, the cognitive assistant 104 registers with a push mail server 106 to receive notifications of new email messages. Similarly, the cognitive assistant 104 registers with an instant messaging server 108 to receive notifications of instant messages. For services not supporting push notifications, such as app updates in an App Store, the cognitive assistant 104 may regularly poll the service 110 to check for updates.

The cognitive assistant 104 analyzes incoming messages, for example, from the email server, instant messaging server, and/or app store, and/or others with which the cognitive assistant 104 has registered or is polling. The cognitive assistant 104 may use a cognitive engine to analyze new incoming communications. For example, the cognitive engine 112 may implement techniques such as natural language processing (NLP) to analyze the content of the message. Based on the content, the cognitive assistant 104 assigns a priority weighting to each communication. For example, email content that includes a request to perform an urgent action, an instant message content posing a question to the recipient, and like content that requires an immediate action or response, may be assigned a high weight. An app software update that is labeled as critical may also be given a high weight.

Other emails, instant messages requiring no response (e.g., messages that say "thank you" or "bye" or the like), a non-critical app software update may be given lower weights than those of urgent messages identified above. All aspects of email messages, for example, including the subject line, may be analyzed to determine whether an email message is to be considered as an urgent message. A natural language processing technique may identify text that conveys urgency, for example, "attention", "emergency", "urgent," and/or such other text in the content of the message and/or subject line. Similarly, a natural language processing technique may identify urgency conveyed in a text of an instant message. Whether an app update is a critical update may be determined based on the description of the update (e.g., by performing a natural language processing technique on the description), for instance, generated by the app provider, and/or other metadata associated with the app update.

In some embodiments, two levels of weighting may be used, for example, low and high. Low weighting is assigned to communications which should not be transmitted to a mobile device while the mobile device is in low power mode. High weighting is assigned to communications which should be transmitted to a mobile device even if the mobile device is in low power mode, e.g., regardless of the power mode. Whether a communication should be assigned a low or high weight may be determined based on one or more rules or a criteria meeting a threshold, which may be configured or pre-defined. For example, a communication containing one or more words defined to be considered to indicate urgency, may be given high weight. Other rule-based method or natural language processing methods may be used to determine whether to assign low or high weight to a communication. In another aspect, other weighting scheme may be used, for instance, other than low and high weights.

The cognitive assistant 104 directs highly weighted communications to the mobile device 102. For example, the cognitive assistant 104 may use a threshold to determine which weighed communications are sent to the mobile device 102, and which are delayed to send later when the mobile device 102 is no longer in low power mode.

The cognitive assistant 104 sends one or more communications that are assigned a weight above the threshold, to the mobile device 102. For example, the cognitive assistant 104 pushes an urgent email to the mobile device 102. For app updates, if the mobile device 102 has sufficient power to download and install a critical update, the cognitive assistant 104 instructs the mobile device 102 to temporarily disable the mobile app until the update can be applied.

Once the mobile device 102 is sufficiently charged (e.g., has battery power above a threshold level, e.g., 80% charged), the mobile device 102 may exit its low power mode. Responsive to turning off its low power mode, the mobile device 102 may send an instruction is to the cognitive assistant 104 to no longer register for, and receive communications, for this mobile device 102. The mobile device 102 turns back on services such as automatic fetching of emails, messages, and app updates, and/or others which were turned off when it went into low power mode. The cognitive assistant 104 sends any lower weighted communications to the mobile device 102 that it was previously withholding (e.g., because those communications did not meet the threshold for urgency).

The mobile device 102 may include a smartphone, or another mobile device, which can receive and transmit data such as messages, and which can download data such as apps to its local storage. A mobile device has one or more hardware processors and memory, and includes an operating system for running the mobile device.

A cognitive assistant 104 may execute on one or more hardware processors and communicate, for instance, via a wireless network or another communication network, with the mobile device 102. One or more hardware processors running the cognitive assistant 104 may function as cloud-based computing environment, and may be coupled to one or more memory devices and/or storage devices.

Figure 2:
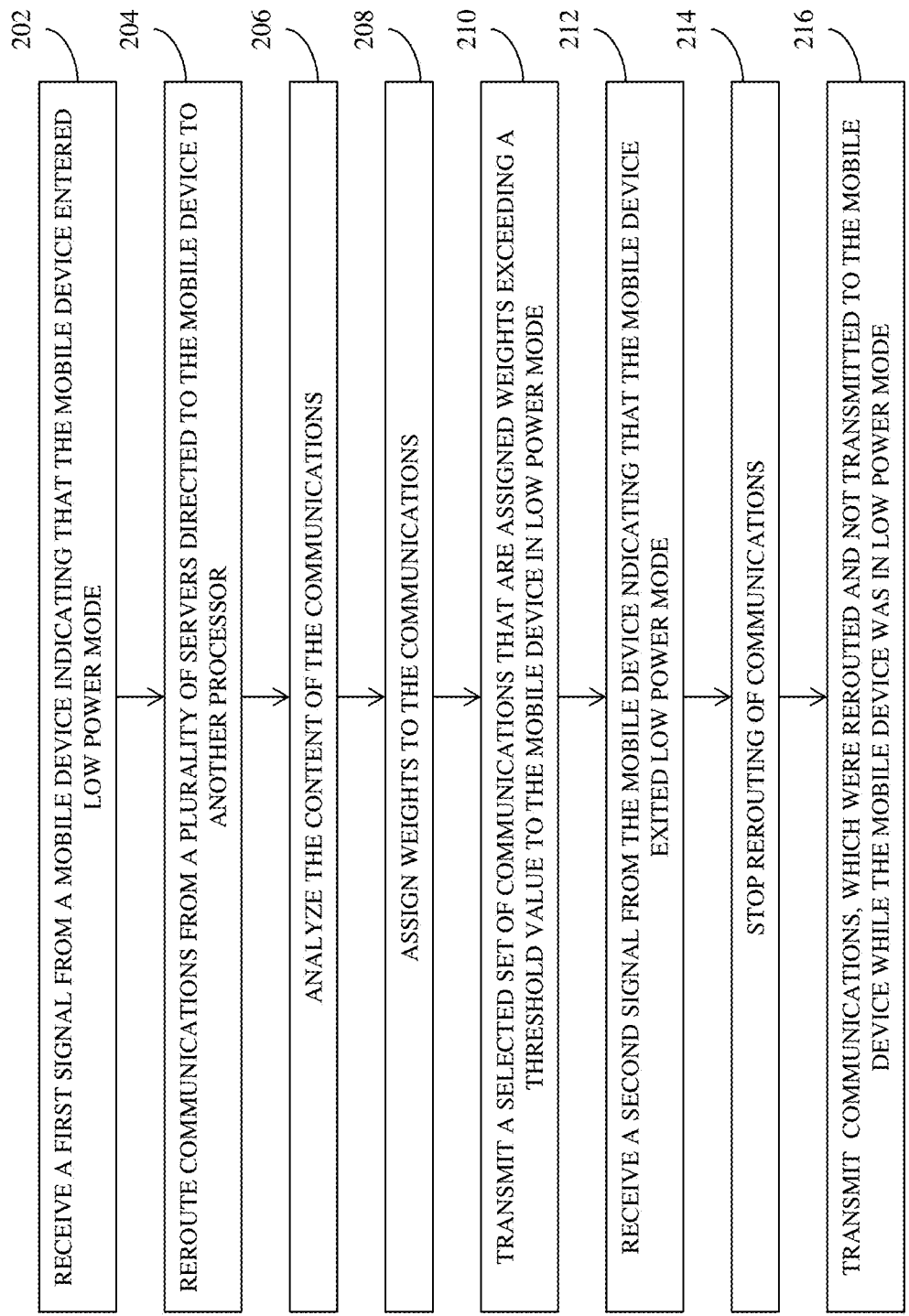
FIG. 2 is a flow diagram illustrating a cognitive assistant method for mobile devices in low power mode in one embodiment.

FIG. 2 is a flow diagram illustrating a cognitive assistant method for mobile devices in low power mode in one embodiment. At 202, a hardware processor running a cognitive assistant, and for example, coupled with a smartphone device or another mobile device, receives a signal (referred to as a first signal) from the mobile device over a communication network such as the wireless communication network. The first signal indicates that the mobile device entered low power mode.

At 204, responsive to receiving the first signal, the hardware processor reroutes all communications from a plurality of servers directed to the mobile device, to the hardware processor, such that the hardware processor receives the communications instead of the mobile device receiving the communications. In some embodiment, rerouting communications from a plurality of servers may include registering with the plurality of servers to redirect communications directed to the mobile device to the hardware processor instead. In some embodiment rerouting communications from a plurality of servers may include polling at least one of the plurality of servers to redirect communications that are directed to the mobile device.

At 206, the hardware processor running the cognitive assistant may analyze the communications' content, for instance, by performing a natural language processing analysis, or another analysis that determines the semantic meaning of the content of the communications. Metadata associated with the communications (e.g., email headers or other labels) may be also parsed to determine the content of the communication.

At 208, based on the analyzed content of the communications, the hardware processor assigns weights to the communications.

At 210, the hardware processor transmits a selected set of communications that are assigned weights exceeding a threshold value, to the mobile device in low power mode. So for example, each of the communications that are analyzed and given a weight may be compared with a threshold weight, and those having weights that exceed the threshold may be selected for sending even when the mobile device in low power mode. For instance, a communication in the selected set may include an update of an app installed on the mobile device, and the hardware processor instructs the mobile device to temporarily disable the app installed on the mobile device, and downloads the update responsive to the mobile device disabling the app. As another example, a communication in the selected set may include an urgent email message. Yet as another example, a communication in the selected set may include an urgent instant message that requires an immediate response. Whether a message is urgent may be determined based on performing a natural language technique on the content of the communication, and/or parsing header information of the message and/or other metadata associated with the message, for example.

At 212, the hardware process may receive a second signal from the mobile device, for instance, via the communication network. The second signal indicates that the mobile device exited low power mode.

At 214, responsive to receiving the second signal, the hardware processor stops the rerouting, allowing future communications from the plurality of servers to be directed to the mobile device.

At 216, the hardware processor transmits the communications, which were rerouted and held (not transmitted to the mobile device while the mobile device was in low power mode), to the mobile device that is no longer in low power mode.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
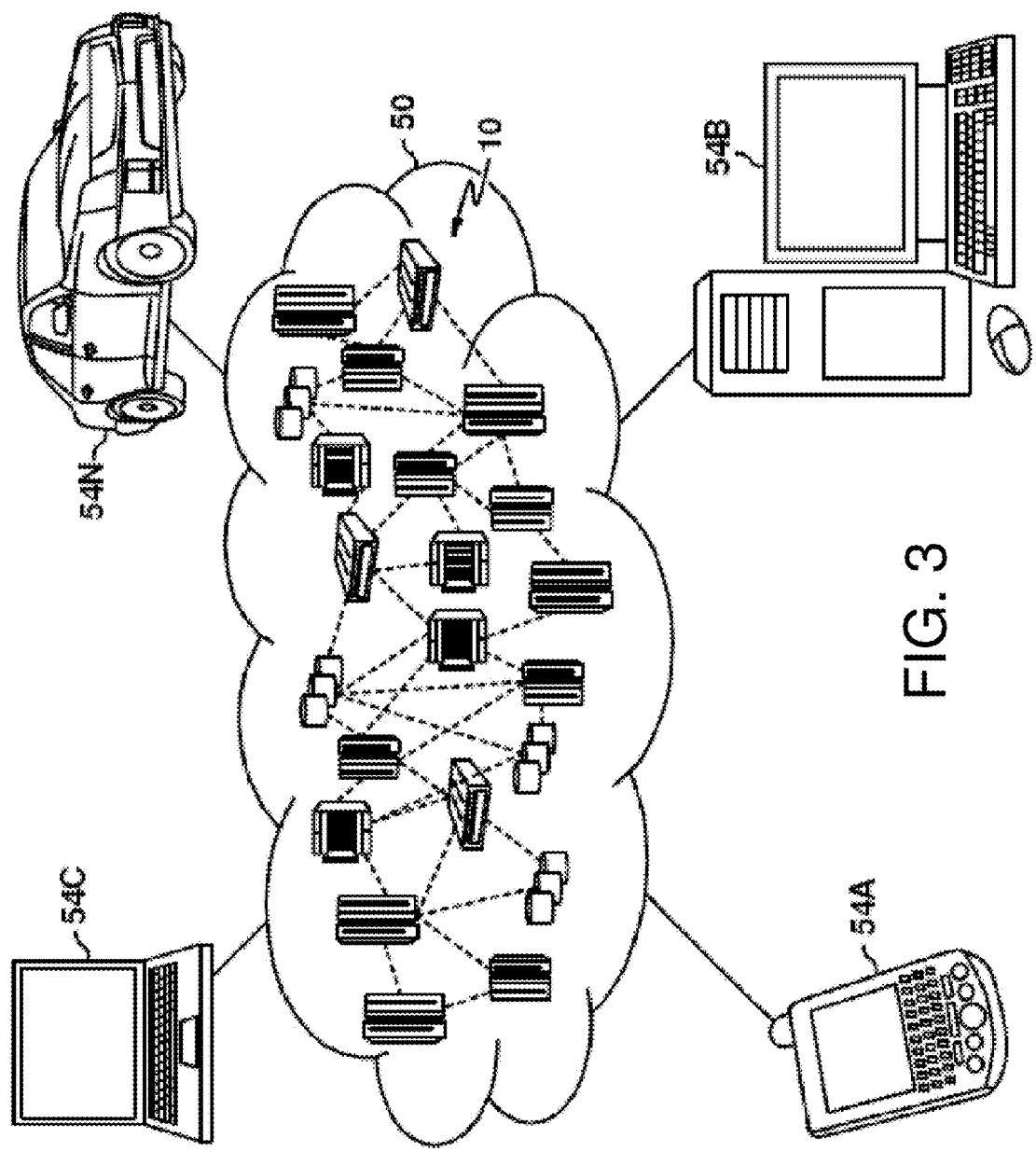
FIG. 3 illustrates a cloud computing environment in one embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
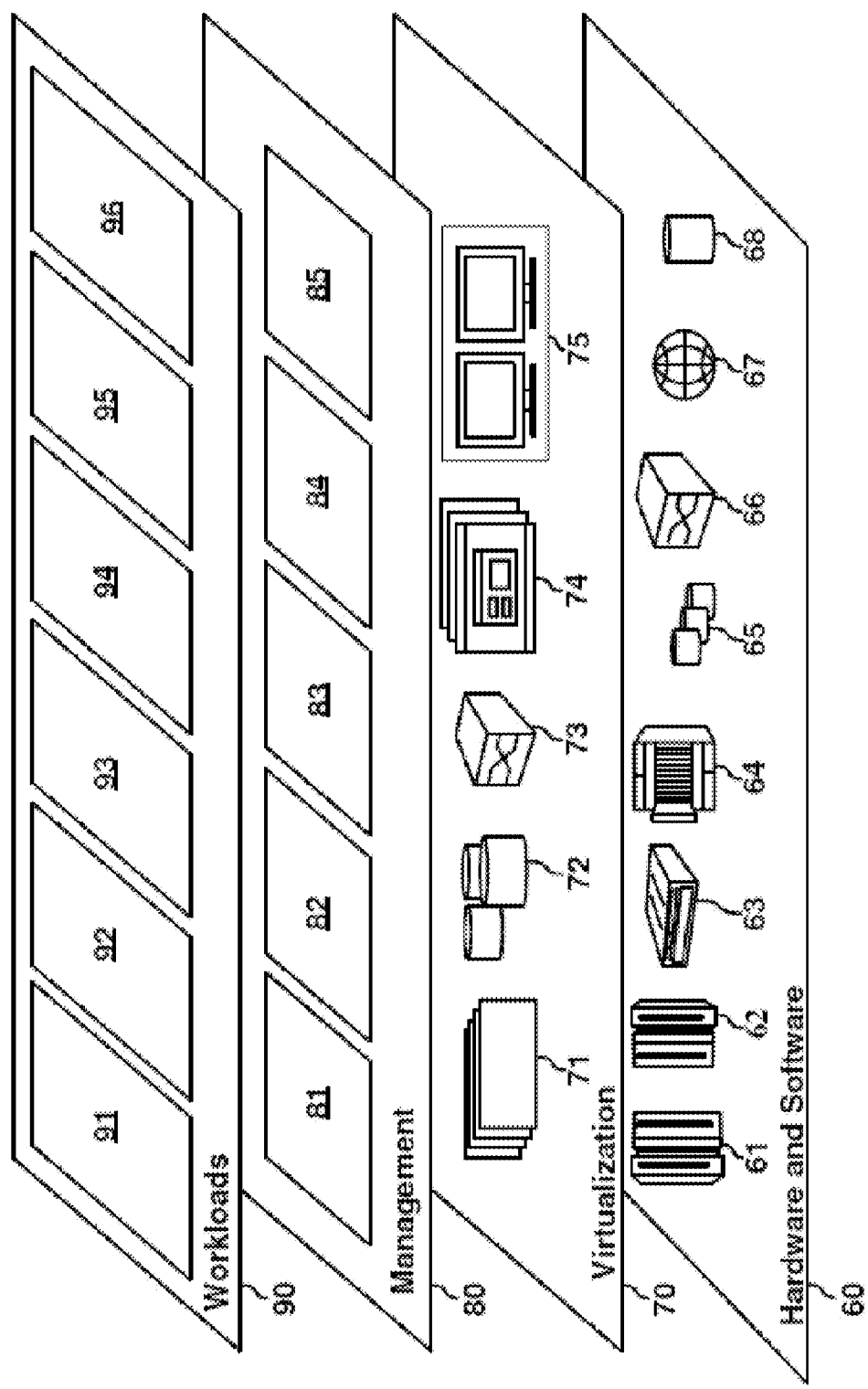
FIG. 4 illustrates a set of functional abstraction layers provided by cloud computing environment in one embodiment of the present disclosure.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive assistant processing 96.

Figure 5:
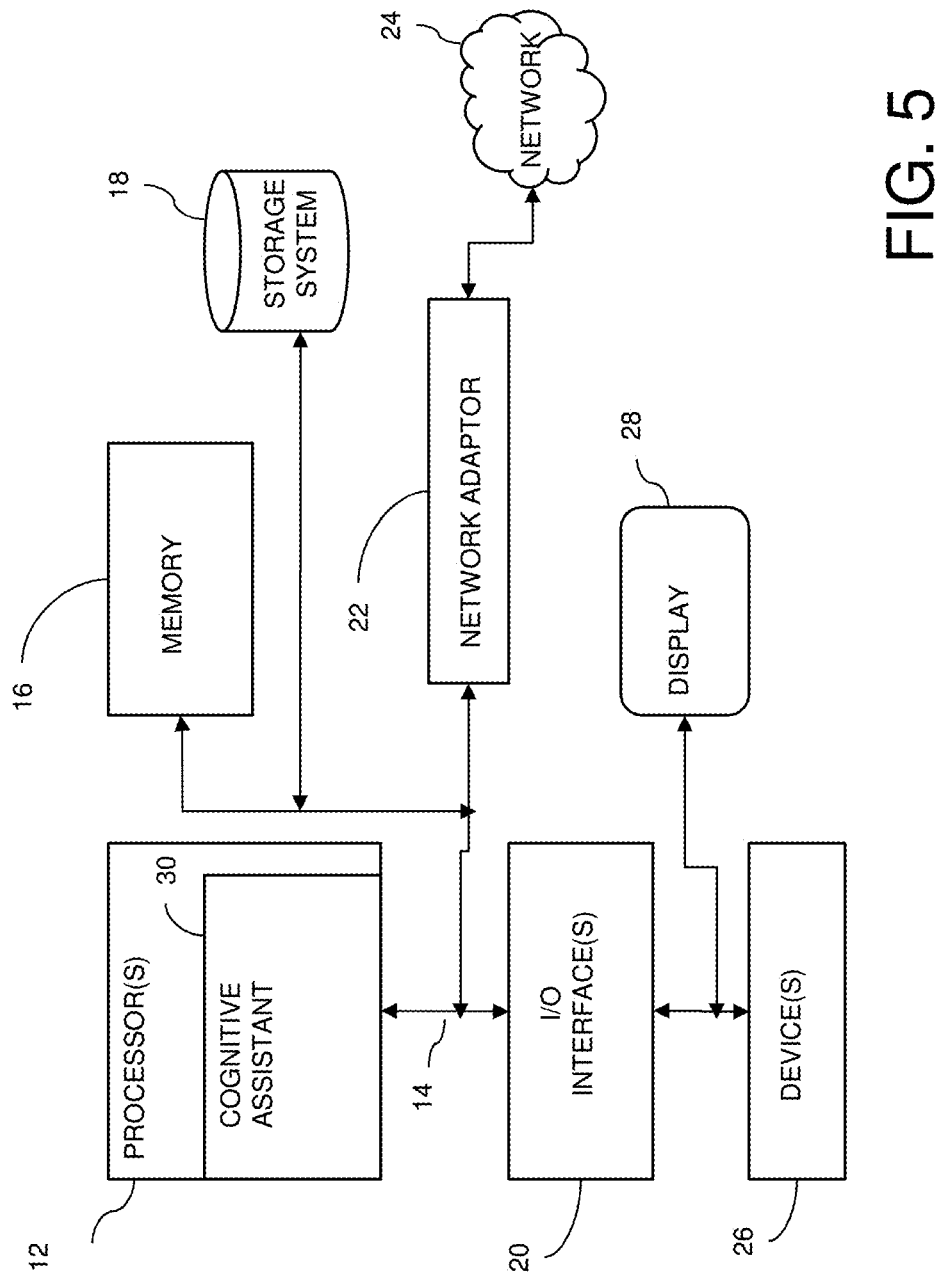
FIG. 5 illustrates a schematic of an example computer or processing system that may implement a cognitive assistant system in one embodiment of the present disclosure.

FIG. 5 illustrates a schematic of an example computer or processing system that may implement a cognitive assistant system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a cognitive assistant module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A cognitive assistant method for mobile devices in low power mode, comprising:

receiving by a hardware processor a first signal from a mobile device via a communication network, the first signal indicating that the mobile device entered low power mode;
responsive to receiving the first signal, rerouting a communication directed to the mobile device, to the hardware processor, wherein the hardware processor receives the communication instead of the mobile device receiving the communication;
analyzing by the hardware processor the communication's content;
assigning a weight to the communication by the hardware processor based on the analyzing;
responsive to determining that the weight exceeds a threshold, transmitting by the hardware processor, the communication to the mobile device in low power mode; and
responsive to determining that the weight does not exceed the threshold, delaying by the hardware processor, transmitting of the communication to the mobile device until the mobile device is no longer in low power mode.

2. The method of claim 1, further comprising:
receiving a second signal from the mobile device via the communication network, the second signal indicating that the mobile device exited low power mode;
responsive to receiving the second signal, allowing a future communication to be directed to the mobile device; and
transmitting the communication, which was rerouted and not transmitted to the mobile device while the mobile device was in low power mode.

3. The method of claim 1, wherein the rerouting communication comprises registering with a source of the communication to redirect communications directed to the mobile device to the hardware processor.

4. The method of claim 1, wherein the rerouting communications comprises polling at least one source a communication directed to the mobile device.

5. The method of claim 1, wherein the analyzing comprises executing a natural language technique to determine a semantic meaning of the communication.

6. The method of claim 1, wherein the communication having the weight exceeding the threshold comprises at least an update of an app installed on the mobile device, and the hardware processor instructs the mobile device to temporarily disable the app installed on the mobile device, and downloads the update responsive to the mobile device disabling the app.

7. A computer readable storage medium storing a program of instructions executable by a machine to perform a cognitive assistant method for mobile devices in low power mode, the method comprising:

receiving by a hardware processor a first signal from a mobile device via a communication network, the first signal indicating that the mobile device entered low power mode;
responsive to receiving the first signal, rerouting a communication directed to the mobile device, to the hardware processor, wherein the hardware processor receives the communication instead of the mobile device receiving the communication;
analyzing by the hardware processor the communication's content;
assigning a weight to the communication by the hardware processor based on the analyzing;

responsive to determining that the weight exceeds a threshold, transmitting by the hardware processor, the communication to the mobile device in low power mode; and responsive to determining that the weight does not exceed the threshold, delaying by the hardware processor, transmitting of the communication to the mobile device until the mobile device is no longer in low power mode.

8. The computer readable storage medium of claim 7, further comprising:

receiving a second signal from the mobile device via the communication network, the second signal indicating that the mobile device exited low power mode;

responsive to receiving the second signal, allowing a future communication to be directed to the mobile device; and transmitting the communication, which was rerouted and not transmitted to the mobile device while the mobile device was in low power mode.

9. The computer readable storage medium of claim 7, wherein the rerouting communication comprises registering with a source of the communication to redirect communications directed to the mobile device to the hardware processor.

10. The computer readable storage medium of claim 7, wherein the rerouting communications comprises polling at least one source a communication directed to the mobile device.

11. The computer readable storage medium of claim 7, wherein the analyzing comprises executing a natural language technique to determine a semantic meaning of the communication.

12. The computer readable storage medium of claim 7, wherein the communication having the weight exceeding the threshold comprises at least an update of an app installed on the mobile device, and the hardware processor instructs the mobile device to temporarily disable the app installed on the mobile device, and downloads the update responsive to the mobile device disabling the app.

13. A cognitive assistant system for mobile devices in low power mode, comprising:

a hardware processor coupled with a communication interface and communicating with a mobile device and at least one source, the hardware processor operable to:

receive a first signal from the mobile device, the first signal indicating that the mobile device entered low power mode;

responsive to receiving the first signal, reroute a communication directed to the mobile device, to the hardware processor, wherein the hardware processor receives the communication instead of the mobile device receiving the communication;

analyze the communication's content;

assign a weight to the communication based on the analyzing;

responsive to determining that the weight exceeds a threshold, transmit the communication to the mobile device in low power mode; and responsive to determining that the weight does not exceed the threshold, delay transmitting of the communication to the mobile device until the mobile device is no longer in low power mode.

14. The system of claim 13, wherein the hardware processor is further operable to:

receive a second signal from the mobile device, the second signal indicating that the mobile device exited low power mode;

responsive to receiving the second signal, allow a future communication to be directed to the mobile device; and transmit the communication, which was rerouted and not transmitted to the mobile device while the mobile device was in low power mode.

15. The system of claim 13, wherein the hardware processor rerouting the communication comprises registering with a source of the communication to redirect communications directed to the mobile device to the hardware processor.

16. The system of claim 13, wherein the hardware processor rerouting the communication comprises polling at least one source a communication directed to the mobile device.

17. The system of claim 13, wherein the hardware processor analyzing comprises executing a natural language technique to determine a semantic meaning of the communication.

18. The system of claim 13, wherein the communication having the weight exceeding the threshold comprises at least an update of an app installed on the mobile device, and the hardware processor instructs the mobile device to temporarily disable the app installed on the mobile device, and downloads the update responsive to the mobile device disabling the app.

19. The system of claim 13, wherein the communication having the weight exceeding the threshold comprises at least an email message analyzed to be urgent.

20. The system of claim 13, wherein the communication having the weight exceeding the threshold comprises at least an instant message requiring a response.

* * * * *